Patented Jan. 28, 1947

2,415,039

UNITED STATES PATENT OFFICE 2,415,039

ALDEHYDE CELLULOSE PRODUCTS AND THE PROCESS OF MAKING SAME

John B. Rust, West Orange, N. J., assignor to Montclair Research Corporation, a corporation of New Jersey No Drawing. Application March 23, 1944, Serial No. 527,828

11 Claims. (Cl. 106—197)

The present invention relates to cellulose derivatives and to the process of making same. It is an object of this invention to provide derivatives of cellulose which are soluble in dilute alkalies.

It is a further object of this invention to make available cellulose derivatives which are useful as textile sizing compositions.

It is an object of this invention to provide wash- and laundering-fast cellulose textile sizes.

It is a further object to provide cellulose derivatives which may be dissolved in alkali solution and spun into fibers in a suitable precipitating bath for the production of artificial silk or precipitated in the form of film or foils. It is also an object of this invention to provide paper sizing and modifying agents.

Other objects and advantages will become apparent from the more detailed description of the invention given hereinafter. Such detailed description should not be construed as limiting, but only by way of explanation and illustration, since numerous variations may be made by those skilled in the art without departing from the scope and spirit of the present invention.

The derivatives of the present invention may be formed by the reaction of an alkali cellulose derivative, as for instance, soda cellulose, potash cellulose, lithium cellulose, quaternary ammonium cellulose and the like with alpha-beta unsaturated aldehydes. The reaction may be effected in the cold, in some instances, and in others by the application of heat.

As instances of aldehydes which may be used in the process of the present invention are acrolein, methacrolein, ethacrolein, 2-ethyl hexenal, crotonaldehyde, and the like. I may first react cellulose with sodium hydroxide, for instance, to form soda cellulose. After aging the soda cellulose to a satisfactory degree, as explained below, it is mixed with cooling with the alpha-beta unsaturated aldehyde. Reaction is effected either in the cold or the reaction mixture is allowed to warm up and further heating applied. I prefer to employ aldehydes which are substituted in the alpha-position since they are not capable of undergoing aldol condensation and hence are non-resinifying with alkalies. However, I may use unsubstituted aldehydes and work with diluents or at low temperatures to obviate or reduce resinifying reactions. Thus, the aldehydes of the present invention may be represented by:

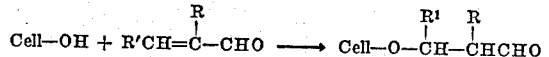

where R and R¹ may be alkyl, aryl, alkaryl, aralkyl, olefinyl, alkynyl, and the like or hydrogen.

In the reaction of the present invention, it is suggested that the following reaction may occur. Representing cellulose as Cell—OH:

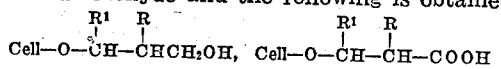

Since rather strong alkaline conditions are employed, it is suggested that the aldehyde reaction product may undergo to some extent the Cannizzaro reaction and a mixture of the above substituted aldehyde and the following is obtained:

$$\text{Cell—O—}\overset{R^1}{\underset{|}{C}}\text{H—}\overset{R}{\underset{|}{C}}\text{HCH}_2\text{OH}, \quad \text{Cell—O—}\overset{R^1}{\underset{|}{C}}\text{H—}\overset{R}{\underset{|}{C}}\text{H—COOH}$$

The above is given by way of possible explanation only and should not be construed as limiting since I do not wish to be limited by any theoretical explanation of the reaction of the present invention.

The cellulose derivatives are soluble in alkalies, with cooling or not, according to the number and kind of substituted groups. Thus, I may make a derivative which is insoluble in alkali at ordinary temperatures but which is readily soluble by cooling the alkali suspension to about 0° C. Such solutions are valuable as textile sizing agents. The solutions, usually of about 1% to 10% strength, are applied to cotton, linen, or rayon goods on a padder, squeezed, dried and coagulated by using a solution of an acid, acid salt, or a precipitating concentrated salt solution. The treated textile is washed thoroughly after coagulating and then dried. A firm hand is imparted to the fabric which is resistant to laundering and the ordinary cleansing agents. The finish may be applied at practically any convenient stage of processing such as before kier boiling, before dyeing and the like.

Since the derivatives of the present invention contain aldehyde groups they may be caused to undergo further reaction, as for instance with aldehydes, acids, phenols, amines and ammonia, hydroxylamine, hydrazine, hydrogen cyanide and the like. Thus, if used as a sizing material, the derivatives of the present invention may be subjected to heat after coagulation which causes a further reaction of the aldehyde group with subsequent cross-linking and curing of the derivative on the textile. On the other hand a textile sized with the derivatives of the present invention may be treated with formaldehyde or other aldehyde in order to effect curing and fixation. Still further, the textiles sized with the derivatives of this invention may be treated with ammonia, amines, or other nitrogenous derivatives reactive with aldehydes. Such treated sized textiles are then much more receptive to dyestuffs capable of dyeing wool, silk, hair and the like.

Cellulose in its various forms may be used in the present invention. However, after forming the alkali or quaternary ammonium cellulose, I prefer to age it to secure some controlled degradation until the desired viscosity is obtained. The viscosity may be varied both by using different forms and sources of cellulose, by introducing more or less reactant and by degrading the cellulose to a greater or lesser degree.

In the reaction of the present invention, I may use inert diluents if desired such as ethylene dichloride, carbon tetrachloride, benzene, ethyl ether, heptane and the like. When making the alkali cellulose, concentrations of from 15% to 50% of alkali may be used although greater or lesser concentrations can be employed. I usually prefer to employ concentrations of about 30% to 40%. This is also true of the quaternary ammonium hydroxides. When using these latter materials solution of the cellulose sometimes occurs. In such cases, the solutions may be diluted with alkali metal hydroxide solutions before reaction. Such quaternary ammonium hydroxides may be trimethyl benzyl ammonium hydroxide, tetraethyl ammonium hydroxide, diethyl dipropyl ammonium hydroxide, diethyl piperidinium hydroxide, methyl pyridinium hydroxide and the like.

The proportions of reactants may be varied within very large limits of, for instance, from 5% to about 100% of the cellulose. For several reasons it may be desirable to use an excess of unsaturated aldehyde. For instance, in some cases a Cannizzaro reaction occurs very readily, or a resinification reaction occurs with subsequent impoverishment of the mixture of the aldehyde. On the other hand a greater proportion of unsaturated aldehyde may be used to accelerate the reaction, which may then be terminated before completion, if desired.

As well as utilizing the aldehydes given above, I may also use alpha-beta unsaturated aldehydes containing other negative substituents as for instance alpha-cyano acrolein, alpha-carbethoxy acrolein, beta-cyano acrolein; beta-carbethoxy acrolein, alpha-acetyl acrolein, beta-acetyl acrolein, alpha-beta-diacetyl acrolein, maleic dialdehyde, and the like. These may be represented by the general formula

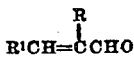

where besides being alkyl, aryl, etc., R and R$^1$ may by cyano, carboxy, carbalkoxy, aldehydo, acyl and the like.

Therefore, the process of the present invention consists in allowing cellulose to react with an excess of a 15% to 50% (preferably about 30% to 40%) aqueous solution of an alkali such as sodium hydroxide to form alkali cellulose. The amount of alkali amounts to from 3 to about 8 moles per $C_6H_{10}O_5$ group of cellulose. To this mixture is then added from 5% to about 100% (based on dry cellulose) of an alpha-beta unsaturated aldehyde as above defined and reacted for a period from 1 to about 5 hours. The reaction temperature is between ice temperature and boiling, higher temperatures being employed when a degraded product (that is, one producing a lower viscosity) is desired, but in any case it is desirable to start the reaction at ice temperature. Afterwards the reaction mixture is acidified, whereby the product is coagulated and can be filtered, washed and dried. The dried product is capable of dissolving in dilute aqueous alkalies to form a homogeneous solution useful particularly as a wash-fast size for fabrics.

The following examples are given to illustrate the products and processes of the present invention. All proportions are in parts by weight.

Example 1.—64 parts of soda cellulose, containing 15.6% of cellulose and 84.4% of 30% sodium hydroxide solution and aged for 16 hours, were mixed with 20 parts of crushed ice and 10 parts of methacrolein. The mixture was homogenized and allowed to come to room temperature. It was then brought to 30° C. for 3 hours. The mixture formed a solution when diluted with water. The derivative was coagulated by addition of HCl solution, washed with water and acetone and dried. This derivative was a white powdery substance and was readily soluble at room temperature in 5% to 10% sodium hydroxide solution to give a thin solution of 5% methacrolein cellulose.

Example 2.—66.5 parts of soda cellulose, containing 15 parts of cellulose, and 51.5 parts of 33⅓% sodium hydroxide solution, were mixed with 10 parts of snow and 5 parts of methacrolein. The mixture was thoroughly homogenized and 20 parts of water added. The mixture was allowed to come to room temperature over a one hour period, then reacted for 1 hour at 50° C. A white product was obtained which was acidified with acetic acid, and washed thoroughly with water and acetone and dried. A white fibrous material was formed which was soluble in sodium hydroxide solutions on cooling.

Example 3.—A solution of the methacrolein-cellulose of Example 2 was made by mixing 4 parts of methacrolein-cellulose with 30 parts of 33% sodium hydroxide solution, 70 parts of water and 100 parts of crushed ice. The solution was clear and relatively non-viscous. A piece of cotton broadcloth was immersed in the solution, the excess solution squeezed out and the textile dried. The cloth was then passed through a bath containing 10% sulfuric acid and finally washed and dried. A firm hand was imparted to the cloth. This was not diminished to any substantial extent upon laundering.

Example 4.—64 parts of soda cellulose, containing 10 parts of cellulose and 54 parts of 30% sodium hydroxide solution, were mixed with 20 parts of crushed ice and 10 parts of crotonaldehyde. The mixture was allowed to warm to room temperature and was then heated to 40° C. for 2 hours. A dark red mixture was obtained which when neutralized, washed with water and acetone and dried, was a light yellow powder. The crotonaldehyde-cellulose was soluble in 10% sodium hydroxide solution with cooling to give a viscous yellow solution of 5% strength.

Example 5.—77 parts of soda cellulose, containing 20 parts of cellulose and 57 parts of 30% sodium hydroxide solution, were mixed with 20 parts of 2-ethyl-3-propyl acrolein. The mixture was heated at 60° C. for 2½ hours, then neutralized, washed with water and acetone and dried. A white fibrous mass was obtained which was soluble in 10% sodium hydroxide solution with cooling.

Example 6.—35 parts of soda cellulose, containing 10 parts of cellulose and 25 parts of 33⅓% sodium hydroxide solution, were mixed with 10 parts of ice and then 50 parts of a 10% solution of acrolein in dioxan were mixed in and homogenized. The mixture was allowed to come to room temperature for 1 hour and then at 40°-60° C. for 1 hour. The reaction mixture was neutralized with acetic acid, washed with water and acetone and dried. A white fibrous derivative was obtained which was soluble in 10% sodium hydroxide solution with cooling to give a viscous solution of 5% strength.

I claim:

1. The process of making an aldehyde-cellulose product which is soluble in dilute aqueous alkali solutions, which consists in reacting an alpha-beta unsaturated aldehyde with alkali cellulose, coagulating the reaction mixture by acidifying it, and recovering the reaction product by filtering, washing and drying the same; the aldehyde being represented by the formula

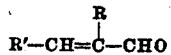

where R and R' are selected from the class consisting of hydrogen and alkyl, aryl, aralkyl, olefinyl, alkynyl, cyano, carboxy, carbalkoxy, aldehydo and acyl groups.

2. The process of making an aldehyde-cellulose product which is soluble in dilute aqueous alkali solutions, which consists in allowing cellulose to react with a 30% to 40% aqueous solution of sodium hydroxide until soda cellulose is formed, adding thereto an alpha-beta unsaturated aldehyde in amount from about 5% to 100% of the cellulose and permitting same to react at between ice temperature and below boiling temperature until an aldehyde-cellulose compound is formed, acidifying the reaction mixture and recovering the reaction product by filtering, washing and drying same; the aldehyde being represented by the formula

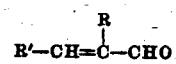

where R and R' are selected from the class consisting of hydrogen and alkyl, aryl, aralkyl, olefinyl, alkynyl, cyano, carboxy, carbalkoxy, aldehydo and acyl groups.

3. Process of making an aldehyde-cellulose product which is soluble in dilute aqueous alkali solutions, which consists in reacting methacrolein and alkali cellulose, acidifying the reaction mixture and recovering the reaction product by filtering, washing and drying the same.

4. Process of making an aldehyde-cellulose product which is soluble in dilute aqueous alkali solutions, which consists in reacting 2-ethyl-3-propyl acrolein, and alkali cellulose, acidifying the reaction mixture and recovering the reaction product by filtering, washing and drying the same.

5. Process of making an aldehyde-cellulose product which is soluble in dilute aqueous alkali solutions, which consists in reacting acrolein and alkali cellulose, acidifying the reaction mixture and recovering the reaction product by filtering, washing and drying the same.

6. An aldehyde-cellulose product soluble in dilute aqueous alkalies, consisting of the acid-coagulated, washed and dried reaction product of an alpha-beta unsaturated aldehyde and alkali cellulose; the aldehyde being represented by the formula

where R and R' are selected from the class consisting of hydrogen and alkyl, aryl, aralkyl, olefinyl, alkynyl, cyano, carboxy, carbalkoxy, aldehydo and acyl groups.

7. An aldehyde-cellulose product soluble in dilute aqueous alkalies, consisting of the acid-coagulated, washed and dried reaction product of an alpha-beta unsaturated aldehyde and soda cellulose, the soda cellulose being prepared with a 30% to about 40% aqueous sodium hydroxide solution with the amount of sodium hydroxide equal to from 3 to about 8 moles NaOH per $C_6H_{10}O_5$ group of cellulose, and the amount of unsaturated aldehyde being from 5% to about 100% of the cellulose; the aldehyde being represented by the formula

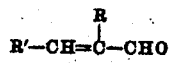

where R and R' are selected from the class consisting of hydrogen and alkyl, aryl, aralkyl, olefinyl, alkynyl, cyano, carboxy, carbalkoxy, aldehydo and acyl groups.

8. An aldehyde-cellulose product soluble in dilute aqueous alkalies, consisting of the acid-coagulated, washed and dried reaction product of methacrolein and alkali cellulose.

9. An aldehyde-cellulose product soluble in dilute aqueous alkalies, consisting of the acid-coagulated, washed and dried reaction product of 2-ethyl-3-propyl acrolein and alkali cellulose.

10. An aldehyde-cellulose product soluble in dilute aqueous alkalies, consisting of the acid-coagulated, washed and dried reaction product of acrolein and alkali cellulose.

11. A solution of the aldehyde-cellulose product of claim 6 in dilute aqueous sodium hydroxide solution.

JOHN B. RUST.